(12) United States Patent
Xiu

(10) Patent No.: US 11,375,261 B2
(45) Date of Patent: Jun. 28, 2022

(54) TERMINAL CONTROL METHOD AND TERMINAL

(71) Applicant: Huawei Technologies Co., Ltd., Shenzhen (CN)

(72) Inventor: Dongyang Xiu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/652,120

(22) PCT Filed: Sep. 30, 2018

(86) PCT No.: PCT/CN2018/108945
§ 371 (c)(1),
(2) Date: Mar. 30, 2020

(87) PCT Pub. No.: WO2019/062999
PCT Pub. Date: Apr. 4, 2019

(65) Prior Publication Data
US 2020/0252676 A1 Aug. 6, 2020

(30) Foreign Application Priority Data

Sep. 30, 2017 (CN) .......................... 201710918858.X
Mar. 29, 2018 (CN) .......................... 201810276176.8

(51) Int. Cl.
*H04N 21/422* (2011.01)
*G06F 40/205* (2020.01)
(Continued)

(52) U.S. Cl.
CPC ..... *H04N 21/42214* (2013.01); *G06F 40/205* (2020.01); *H04N 21/4383* (2013.01); *H04N 21/47217* (2013.01); *H04N 21/4852* (2013.01)

(58) Field of Classification Search
CPC ....... H04W 12/06; H04W 4/80; H04W 12/04; H04W 12/041; H04W 12/50;
(Continued)

(56) References Cited

U.S. PATENT DOCUMENTS 7,436,346 B2 10/2008 Walter et al.
7,725,102 B2 5/2010 Engstrom et al.
(Continued)

FOREIGN PATENT DOCUMENTS

CN 201443822 U 4/2010
CN 101909171 A 12/2010
(Continued)

OTHER PUBLICATIONS

"Creating button sequences," Jul. 24, 2017, 4 pages.
"Enjoy your VIERA with TV Remote for Android," Jul. 18, 2017, 17 pages.

*Primary Examiner* — Samira Monshi
(74) *Attorney, Agent, or Firm* — Conley Rose, P.C.

(57) ABSTRACT

A terminal control method includes obtaining, by a first terminal, text information that is input in a preset area of the first terminal, determining an operation type of the text information, recognizing, by the first terminal, the text information based on the operation type to obtain a key matching the text information, generating, by the first terminal, a key value of each key, and sending the generated key value to a second terminal to control the second terminal using the key value.

20 Claims, 7 Drawing Sheets

(51) Int. Cl.
*H04N 21/438* (2011.01)
*H04N 21/472* (2011.01)
*H04N 21/485* (2011.01)

(58) Field of Classification Search
CPC ....... H04W 76/14; H04W 4/70; H04W 12/02; H04W 12/033; H04W 8/005; H04W 12/069; H04W 84/12; H04W 84/18; H04W 12/0431; H04W 12/0471; H04W 12/08; H04W 12/0433; H04W 12/106; H04W 12/108; H04W 12/35; H04W 12/63; H04W 12/77; H04W 4/00; H04W 4/12; H04W 76/10; H04W 88/16; H04W 12/03; H04W 12/037; H04W 12/082; H04W 12/084; H04W 12/10; H04W 12/12; H04W 12/37; H04W 12/42; H04W 12/71; H04W 12/72; H04W 12/75; H04W 12/80; H04W 24/00; H04W 28/04; H04W 28/06; H04W 36/0016; H04W 36/0038; H04W 36/0058; H04W 36/0072; H04W 36/18; H04W 36/30; H04W 48/12; H04W 48/16; H04W 4/02; H04W 4/023; H04W 4/14; H04W 4/21; H04W 4/90; H04W 56/0015; H04W 68/005; H04W 84/20; H04W 88/02; H04W 88/04; H04W 8/24; H04W 92/20; H04N 21/25891; H04N 21/4126; H04N 21/43615; H04N 21/4532; H04N 21/4751; H04N 7/15
See application file for complete search history.

(56) References Cited

U.S. PATENT DOCUMENTS

| | | |
|---|---|---|
| 2013/0330084 A1 | 12/2013 | Du et al. |
| 2014/0085541 A1 | 3/2014 | Sandland et al. |
| 2015/0161883 A1* | 6/2015 | Satgunam ............ G08C 17/02 340/5.8 |

FOREIGN PATENT DOCUMENTS

| | | |
|---|---|---|
| CN | 101916159 A | 12/2010 |
| CN | 102325067 A | 1/2012 |
| CN | 103002142 A | 3/2013 |
| CN | 103024502 A | 4/2013 |
| CN | 103037264 A | 4/2013 |
| CN | 105094087 A | 11/2015 |
| CN | 106647659 A | 5/2017 |

* cited by examiner

| 1 | ABC2 | DEF3 |
|---|---|---|
| GHI4 | JKL5 | MNO6 |
| PQRS7 | TUV8 | WXYZ9 |
| Clear | 0 | ⌫ |

FIG. 3C

| 1 | ABC2 | DEF3 |
|---|---|---|
| GHI4 | JKL5 | X |
| PQRS7 | TUV8 | W 9 Y |
| Clear | 0 | Z |

FIG. 3D

TERMINAL CONTROL METHOD AND TERMINAL

CROSS-REFERENCE TO RELATED APPLICATIONS

This application is a U.S. National Stage of International Patent Application No. PCT/CN2018/108945 filed on Sep. 30, 2018, which claims priority to Chinese Patent Application No. 201810276176.8 filed on Mar. 29, 2018 and Chinese Patent Application No. 201710918858.X filed on Sep. 30, 2017. All of the aforementioned applications are hereby incorporated by reference in their entireties.

TECHNICAL FIELD

This application relates to the field of communications technologies, and in particular, to a terminal control method and a terminal.

BACKGROUND

A user can control an electronic device by using an infrared remote control. A digital television playing terminal is used as an example. An infrared remote control matching the digital television playing terminal can encode button information by using the digital coding technology, and emit a light wave by using an infrared diode. The digital television playing terminal converts an infrared signal received by an infrared receiver into an electrical signal, and decodes the electrical signal to obtain a corresponding instruction, to control the digital television playing terminal to implement functions such as channel switching, volume adjustment, and the like. However, an existing infrared remote control is installed with a limited quantity of physical buttons, and the user needs to perform an operation on the infrared remote control for a plurality of times, to control the digital television playing terminal to implement a corresponding function. For example, a current playing volume of the digital television playing terminal is level 30. The current playing volume of the digital television playing terminal can be decreased by only one level each time the user presses a volume down key on the infrared remote control. If the user expects to adjust the playing volume to level 20, the user needs to press the volume down key on the infrared remote control for 10 times, and the digital television playing terminal needs to respond to 10 pressing operations performed by the user, to adjust the current playing volume. This causes inconvenience of operation and low processing efficiency.

SUMMARY

Embodiments of this application provides a terminal control method and a terminal, to improve processing efficiency and convenience of operation.

According to a first aspect, an embodiment of this application provides a terminal control method. A first terminal may obtain text information that is input in a preset area of the first terminal, and determine an operation type of the text information; and recognize the text information based on the operation type, to obtain at least one key matching the text information. The first terminal may further generate a key value of each key, and send the generated key value to a second terminal, to control the second terminal by using the key value.

In this technical solution, the first terminal may recognize the text information based on the operation type of the input text information, to obtain the at least one key matching the text information, and send the key value of each key to the second terminal, so that the second terminal implements a corresponding function (for example, account login, channel switching, or volume adjustment) in response to the key value. In a conventional terminal control method, the first terminal can generate only one key value when detecting one pressing operation performed by a user on the first terminal, and the user needs to perform a plurality of pressing operations on the first terminal to control the second terminal to implement the corresponding function. By contrast, in this embodiment of this application, the second terminal may be controlled based on the input text information to implement the corresponding function, and the first terminal does not need to detect the plurality of pressing operations performed by the user. This can improve processing efficiency and convenience of operation.

In a design solution, when the operation type is a text input type, a specific manner in which the first terminal recognizes the text information based on the operation type to obtain the at least one key matching the text information may be: The first terminal performs parsing processing on the text information, to obtain at least one character constituting the text information, where the character includes a letter or a digit; determines a position of a cursor on a display screen of the second terminal; determines a key required for moving the cursor from the position to a search area; and determines a key required for moving the cursor from the search area to the first character constituting the text information, a key required for moving the cursor from the first character to the second character constituting the text information, and a key required for moving the cursor to a next character in sequence, until a key required for moving the cursor from the penultimate character constituting the text information to the last character constituting the text information.

In this design solution, the text information may include account information, a program identifier, a user identifier, or the like. The account information may include a user name, a login password, or the like. The program identifier may include a television series name, a movie name, a song name, or the like. The user identifier may include an actor/actress name, a singer name, or the like. The text input type may include an account information input type, a program searching type, or the like. For example, when the user needs to input account information in a process of logging in to an account, the user may directly input text information including the account information in the preset area of the first terminal. For another example, when the user needs to input a program identifier in a process of program search, the user may directly input text information including the program identifier in the preset area of the first terminal. After obtaining the text information that is input in the preset area by the user and determining that an operation type of the text information is the text input type, the first terminal may perform parsing processing on the text information, to obtain at least one character constituting the text information; determine a position of the cursor on the display screen of the second terminal; determine a key required for moving the cursor from the position to the search area; and determine a key required for moving the cursor from the search area to the first character constituting the text information, a key required for moving the cursor from the first character to the second character constituting the text information, and a key required for moving the cursor to a next character in sequence, until a key required for moving the cursor from the penultimate character constituting the text information to the last character constituting the text information, and send key values of the keys to the second terminal.

In a conventional terminal control method, after the first terminal determines the position of the cursor on the display screen of the second terminal, the user needs to press an arrow key on the first terminal for a plurality of times, to control the second terminal to move the cursor from the position to the search area. After detecting a pressing operation performed by the user on an OK key, the first terminal may send a key value of the OK key to the second terminal, so that the second terminal displays a virtual keyboard on the display screen. Further, the user needs to press an arrow key on the first terminal for a plurality of times, to control the second terminal to move the cursor from the search area to a first character on the virtual keyboard. After detecting the pressing operation performed by the user on the OK key, the first terminal may send the key value of the OK key to the second terminal, so that the second terminal obtains the first character. Further, the user needs to press an arrow key on the first terminal for a plurality of times, to control the second terminal to move the cursor from a position of the first character to a position of a second character. After detecting the pressing operation performed by the user on the OK key, the first terminal may send the key value of the OK key to the second terminal, so that the second terminal obtains the second character until the second terminal obtains a last character. In this method, operations are complex, and processing efficiency is relatively low. By contrast, in this embodiment of this application, the user does not need to perform an operation on the first terminal frequently. The first terminal may directly perform parsing processing on the text information that is input by the user, to obtain the at least one character constituting the text information; and determine a key required for inputting each character, and send a key value of each key to the second terminal. This can improve processing efficiency and convenience of operation.

In a design solution, when the operation type is a channel switching type, a specific manner in which the first terminal recognizes the text information based on the operation type to obtain the at least one key matching the text information may be: When the text information includes a digit, the first terminal may determine a key of each digit; or when the text information is a Chinese character, the first terminal may obtain a channel identifier of a channel indicated by the text information, and determine a key of a digit corresponding to the channel identifier.

Further, a specific manner in which the first terminal generates the key value of each key may be: The first terminal generates a key value of each determined key, where a time interval between generation times of every two adjacent key values is less than a preset time threshold.

In this design solution, when the text information includes a digit, the digit may be an identifier of a television station. For example, 1 is an identifier of the China Central Television station, and 32 is an identifier of the Hunan Satellite Television Station. When the text information is a Chinese character, the Chinese character may be a channel identifier of a channel, such as "China Central Television station" or "Hunan Satellite Television". For example, when the user needs to switch a channel in a process of watching a television program, the user may directly input text information including a digit in the preset area of the first terminal. Then, the first terminal may determine a key of each digit included in the text information, and send a key value of each key to the second terminal. A time interval between generation times of every two adjacent key values is less than the preset time threshold. For another example, when the user needs to switch a channel in a process of watching a television program, the user may directly input text information that is a Chinese character in the preset area of the first terminal. The first terminal may determine a channel identifier of a channel indicated by the Chinese character, determine a key of a digit corresponding to the channel identifier, and send a key value of each key to the second terminal. A time interval between generation times of every two adjacent key values is less than the preset time threshold.

In a conventional terminal control method, the user needs to memorize an identifier of a television station, to press a key, of a digit indicated by the identifier of the specified television station, on the first terminal to control the second terminal to switch a channel. If the user forgets the identifier of the specified television station, the user scrolls up and down a program menu to select the identifier of the specified television station, and the first terminal obtains the identifier of the specified television station selected by the user, to control the second terminal to switch the channel. Because the program menu includes identifiers of a plurality of television stations, scrolling up and down to select the identifier of the specified television station increases a channel switching delay, resulting in a relatively low channel switching efficiency. By contrast, in this embodiment of this application, the user does not need to memorize the identifier of the television station. The first terminal may directly obtain the channel identifier of the channel indicated by the text information that the user inputs, determine the key of the digit corresponding to the channel identifier, and send the key value of each key to the second terminal, to control the second terminal to switching the channel. This can improve channel switching efficiency. In addition, in the conventional terminal control method, when the identifier of the specified television station is a number with at least two digits, the user needs to press, within a short time, keys of the digits indicated by the identifier of the specified television station. If a time interval/time intervals at which the user presses the keys of the digits is/are relatively long, a channel switching error occurs, and channel switching accuracy is decreased. By contrast, in this embodiment of this application, a time interval/time intervals at which the user inputs digits in the preset area of the first terminal is/are not limited. The first terminal may directly obtain the text information that is input by the user, determine the key of the digit included in the text information, and send the key value of each key to the second terminal, to control the second terminal to switch the channel. The time interval between the generation times of every two adjacent key values is less than the preset time threshold. This can increase channel switching accuracy.

In a design solution, when the operation type is a volume adjustment type, a specific manner in which the first terminal recognizes the text information based on the operation type, to obtain the at least one key matching the text information may be: When a playing volume of the second terminal is greater than a playing volume indicated by the text information, the first terminal may determine that the key matching the text information is a volume down key; obtain a first difference between the playing volume of the second terminal and the playing volume indicated by the text information; divide the first difference by a decrease variation corresponding to the volume down key, to obtain a first quotient; and use the first quotient as a quantity of volume down keys matching the text information.

In this design solution, when the user needs to adjust a volume in a process of watching a video, the user may input, in the preset area of the first terminal, a playing volume to which a current playing volume of the second terminal is to be adjusted, and the first terminal may obtain the current playing volume of the second terminal. When the playing volume of the second terminal is greater than the playing volume indicated by text information, the first terminal may determine that a key matching the text information is the volume down key; obtain a first difference between the playing volume of the second terminal and the playing volume indicated by the text information; divide the first difference by the decrease variation corresponding to the volume down key, to obtain a first quotient; and use the first quotient as a quantity of volume down keys matching the text information. Then, the first terminal may send key values of the quantity of volume down keys to the second terminal, to control the second terminal to adjust the volume. By contrast, in a conventional terminal control method, the user needs to press the volume down key of the first terminal for a plurality of times, to control the second terminal to adjust the volume. In this embodiment of this application, processing efficiency and convenience of operation can be improved.

In a design solution, when the operation type is a volume adjustment type, a specific manner in which the first terminal recognizes the text information based on the operation type, to obtain the at least one key matching the text information may be: When a playing volume of the second terminal is less than a playing volume indicated by the text information, the first terminal may determine that the key matching the text information is a volume up key; obtain a second difference between the playing volume indicated by the text information and the playing volume of the second terminal; divide the second difference by an increase variation corresponding to the volume up key, to obtain a second quotient; and use the second quotient as a quantity of volume up keys matching the text information.

In this design solution, when the user needs to adjust a volume in a process of watching a video, the user may input, in the preset area of the first terminal, a playing volume to which a current playing volume of the second terminal is to be adjusted, and the first terminal may obtain the current playing volume of the second terminal. When the playing volume of the second terminal is less than the playing volume indicated by text information, the first terminal may determine that a key matching the text information is the volume up key; obtain a second difference between the playing volume indicated by the text information and the playing volume of the second terminal; divide the second difference by the increase variation corresponding to the volume up key to obtain a second quotient; and use the second quotient as a quantity of volume up keys matching the text information. Then, the first terminal may send key values of the quantity of volume up keys to the second terminal, to control the second terminal to adjust the volume. By contrast, in a conventional terminal control method, the user needs to press the volume up key of the first terminal for a plurality of times, to control the second terminal to adjust the volume. In this embodiment of this application, processing efficiency and convenience of operation can be improved.

In a design solution, when the operation type is a program playback type, a specific manner in which the first terminal recognizes the text information based on the operation type, to obtain the at least one key matching the text information may be: The first terminal determines a channel identifier corresponding to a last playback; and when the channel identifier corresponding to the last playback is less than a channel identifier indicated by the text information, the first terminal obtains a quantity of channel identifiers between the channel identifier corresponding to the last playback and the channel identifier indicated by the text information, and determines that the key matching the text information is at least one playback function key, where a quantity of the at least one playback function key is obtained based on the quantity of channel identifiers between the channel identifier corresponding to the last playback and the channel identifier indicated by the text information.

In this design solution, when the user needs to play back a program in a process of watching a video, the user may input, in the preset area of the first terminal, a channel identifier that is to be played back, and the first terminal may determine a channel identifier corresponding to the last playback. When the channel identifier corresponding to the last playback is less than the channel identifier indicated by text information, the first terminal may obtain a quantity of channel identifiers between the channel identifier corresponding to the last playback and the channel identifier indicated by the text information, and determine that the key matching the text information is at least one playback function key, where the quantity of the at least one playback function key is obtained based on the quantity of channel identifiers between the channel identifier corresponding to the last playback and the channel identifier indicated by the text information. Then, the first terminal may send key values of the quantity of playback function keys to the second terminal, to control the second terminal to play back the program. By contrast, in a conventional terminal control method, the user needs to press the playback function key for a plurality of times, to control the second terminal to play back the program. In this embodiment of this application, processing efficiency and convenience of operation can be improved.

In a design solution, when the operation type is a program playback type, a specific manner in which the first terminal recognizes the text information based on the operation type, to obtain the at least one key matching the text information may be: The first terminal determines a channel identifier corresponding to a last playback; and when the channel identifier corresponding to the last playback is greater than a channel identifier indicated by the text information, the first terminal obtains a difference by subtracting a quantity of channel identifiers between the channel identifier corresponding to the last playback and the channel identifier indicated by the text information from a total quantity of channel identifiers that can be played back, and determines that the key matching the text information is at least one playback function key, where a quantity of playback function keys is obtained based on the difference.

In a design solution, before the first terminal recognizes the text information based on the operation type to obtain the at least one key matching the text information, the first terminal may further obtain a character input manner of the second terminal.

Further, a specific manner in which the first terminal recognizes the text information based on the operation type, to obtain the at least one key matching the text information may be: The first terminal recognizes the text information based on the operation type and the character input manner, to obtain the at least one key matching the text information.

In this design solution, one first terminal may control at least one second terminal, and different second terminals may have a same character input manner or different character input manners. For different input manners, different keys matching the text information are obtained. For example, when a character input manner of the second terminal is T9, the first character is "h", and the second character is "a", keys required for moving the cursor from the first character to the second character include an up arrow key, a right arrow key, an OK key, a left arrow key and the OK key. For another example, when a character input manner of the second terminal is a virtual keyboard, the first character is "h", and the second character is "a", keys required for moving the cursor from the first character to the second character include five left arrow keys and an OK key. In this case, the first terminal obtains the character input manner of the second terminal before recognizing the text information, and recognizes the text information based on the operation type and the character input manner, to obtain the at least one key matching the text information. This can increase text information recognition accuracy.

In a design solution, a specific manner in which the first terminal recognizes the text information based on the operation type, to obtain the at least one key matching the text information may be: The first terminal recognizes the text information based on the operation type, to obtain text information after recognition, and obtains the at least one key matching the text information obtained after recognition.

In this design solution, if text information is "I want to watch Youth", the first terminal recognizes the text information based on an operation type, and text information obtained after recognition may be "Search for the television series Youth", "Search for the movie Youth", "Search for the actor/actress Youth", or the like. Further, the first terminal may obtain at least one key matching the text information obtained after recognition.

According to a second aspect, an embodiment of this application provides a computer storage medium. The computer storage medium stores a program, and when the program is executed, a terminal is enabled to perform any terminal control method according to the first aspect.

According to a third aspect, an embodiment of this application provides a terminal. The terminal has a function of implementing actions of the first terminal in the terminal control method examples in the first aspect. The function may be implemented by hardware, or may be implemented by executing corresponding software by hardware. The hardware or software includes one or more units or modules corresponding to the foregoing function.

According to a fourth aspect, an embodiment of this application provides a terminal. The terminal may include a receiver, a processor and a transmitter. The processor is configured to support the terminal in performing a corresponding function of the first terminal in the terminal control method according to the first aspect. The receiver and the transmitter are configured to support communication between the first terminal and a second terminal. The terminal may further include a memory. The memory is configured to be coupled to the processor, and stores a program instruction and data that are necessary for the terminal. For example, the receiver and the transmitter may be integrated into a transceiver.

According to a fifth aspect, an embodiment of this application provides a computer program product including an instruction. When the computer program product is run on a computer, the computer is enabled to perform the method according to the first aspect.

According to a sixth aspect, an embodiment of this application provides a terminal control system. The system includes the first terminal and the second terminal in the foregoing aspects.

According to a seventh aspect, an embodiment of this application provides a chip system. The chip system includes a processor, configured to support a first terminal in implementing functions in the foregoing aspects, for example, generating or processing data and/or information in the foregoing methods.

In a design solution, the chip system further includes a memory. The memory is configured to store a program instruction and data that are necessary for the first terminal. The chip system may include a chip, or may include a chip and another discrete device.

BRIEF DESCRIPTION OF DRAWINGS

FIG. 3C is a schematic diagram of a screen of a virtual keyboard in a T9 layout according to an embodiment of this application;

FIG. 3D is a schematic diagram of a screen on which characters are displayed above a virtual keyboard in a suspended manner according to an embodiment of this application;

DESCRIPTION OF EMBODIMENTS

The following describes the embodiments of this application with reference to the accompanying drawings in the embodiments of this application.

Figure 1:
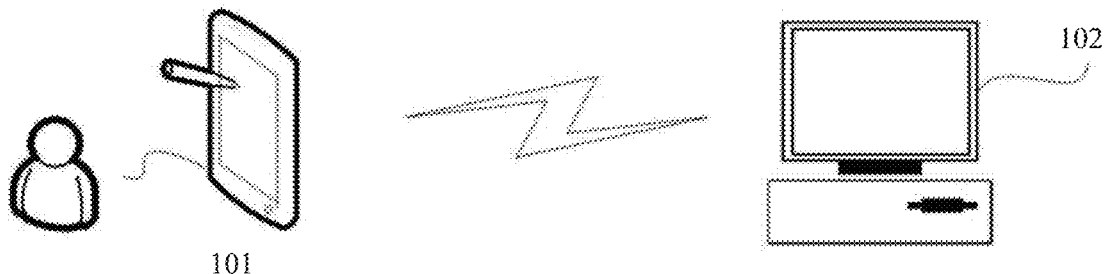
FIG. 1 is a schematic architectural diagram of a terminal control system according to an embodiment of this application.

For better understanding of a terminal control method and a terminal disclosed in the embodiments of this application, the following first describes a network architecture applicable to the embodiments of this application. FIG. 1 is a schematic architectural diagram of a terminal control system according to an embodiment of this application. As shown in FIG. 1, the terminal control system may include at least one first terminal 101 and at least one second terminal 102. One first terminal 101 may establish data communication with at least one second terminal 102, to control the at least one second terminal 102 to implement a corresponding function. Optionally, at least one first terminal 101 may establish data communication with one second terminal 102, and the second terminal 102 may be controlled by the at least one first terminal 101 to implement a corresponding function. The first terminal 101 may obtain text information that is input in a preset area of the first terminal 101, and determine an operation type of the text information; recognize the text information based on the operation type, to obtain at least one key matching the text information; and generate a key value of each key, and send the generated key value to the second terminal 102.

The first terminal 101 may be a terminal configured to communicate with the second terminal 102, and may specifically be any one of a smartphone (such as an Android mobile phone or an iOS mobile phone), a tablet computer, a vehicle-mounted terminal, a wearable terminal, or the like.

The second terminal 102 may be a digital television playing terminal, a smart appliance (such as a refrigerator or an air conditioner), a projector, or the like.

The following first describes a concept that may be used in this application, such as an operation type, a key, or a key value briefly before specific embodiments of this application are described. The operation type may include a text input type, a channel switching type, a volume adjustment type, a program playback type, a playback progress adjustment type, an episode adjustment type, a status control type, or the like. The text input type is an operation type, such as an account information input type, a program search type, or an actor/actress search type, in which a user needs to submit text information to the second terminal by using the first terminal. The channel switching type is an operation type in which the user needs to control, by using the first terminal, the second terminal to switch a channel. The volume adjustment type is an operation type in which the user needs to control, by using the first terminal, the second terminal to adjust a volume. The program playback type is an operation type in which the user needs to control, by using the first terminal, the second terminal to play back a program. The playback progress adjustment type is an operation type in which the user needs to control, by using the first terminal, the second terminal to adjust playback progress. The episode adjustment type is an operation type in which the user needs to control, by using the first terminal, the second terminal to adjust an episode. The status control type is an operation type in which the user needs to control, by using the first terminal, the second terminal to perform an operation such as exiting, returning, or deleting. The key may include one or more of a virtual key, a touch key, or a physical button. Virtual keys may be in a 26-key layout shown in FIG. 3B or a T9 layout shown in FIG. 3C. The touch key may detect an effective touch of a finger accurately regardless of an insulating housing of the first terminal. The physical button may also be referred to as a physical button. The key value is a value used to recognize the key. One key value uniquely corresponds to one key, and key values of different keys are different. For example, a key value of a right arrow key is 39, and a key value of a character A is 65.

It should be noted that, the terminal control method disclosed in the embodiments of this application may be combined with a conventional manner in which the first terminal or a remote control emits an infrared signal to control the second terminal. For example, the first terminal may provide at least one type of control screen for a user to operate, and before or after the second terminal is controlled by using the control screen, the first terminal or the remote control may emit the infrared signal to control the second terminal. For example, the first terminal may obtain text information that is input in the preset area of the first terminal, and determine an operation type of the text information; recognize the text information based on the operation type, to obtain at least one key matching the text information; and generate a key value of each key, and send the generated key value to the second terminal, to control the second terminal by using the key value. Alternatively, the first terminal may obtain a voice message that is input by using a microphone, convert the voice message into text information, and determine an operation type of the text information; recognize the text information based on the operation type, to obtain at least one key matching the text information; generate a key value of each key, and send the generated key value to the second terminal, to control the second terminal by using the key value. Further, the first terminal may emit an infrared signal to the second terminal, to send the key value of each key to the second terminal and control the second terminal by using the key value.

Figure 2:
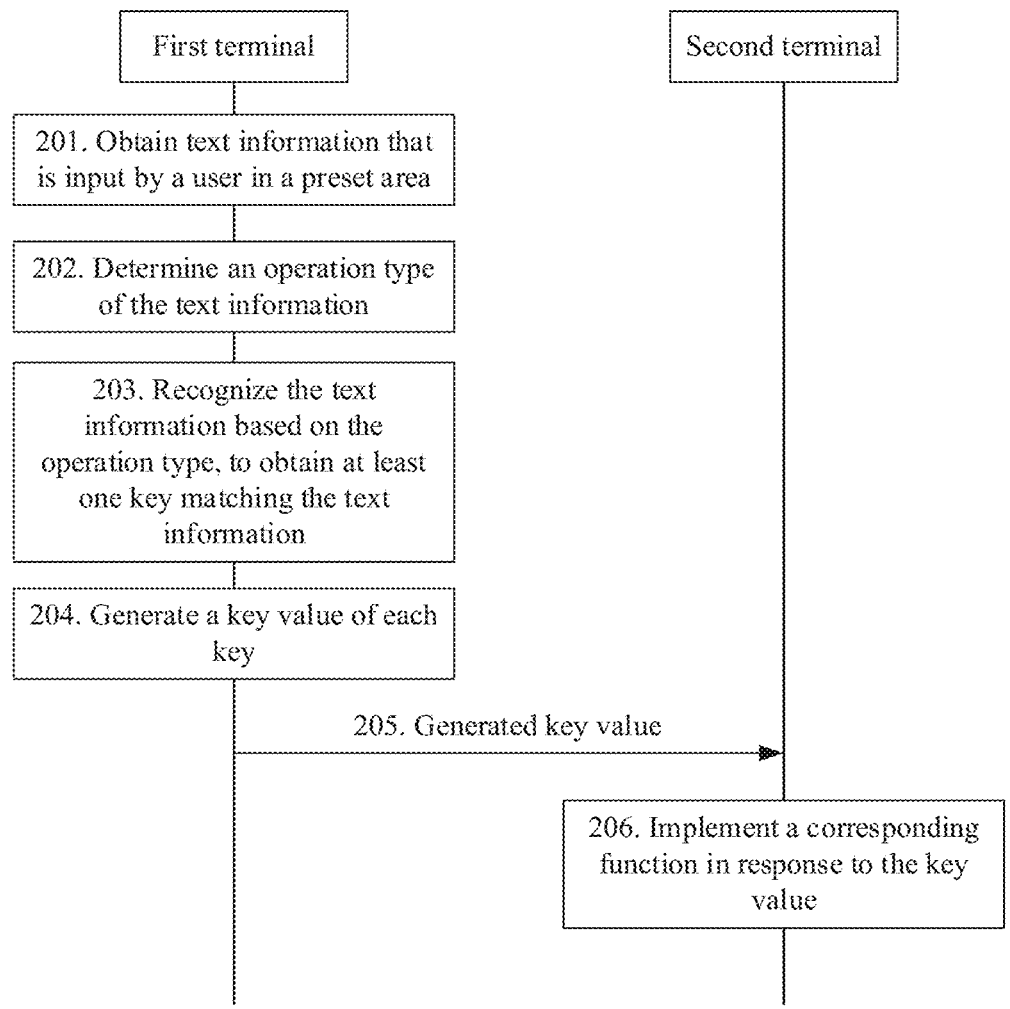
FIG. 2 is a schematic flowchart of a terminal control method according to an embodiment of this application.

Based on the schematic architectural diagram of the terminal control system shown in FIG. 1, FIG. 2 shows a terminal control method according to an embodiment of this application. The method includes but is not limited to the following steps.

Step S201: A first terminal obtains text information that is input in a preset area by a user.

Figure 3A:
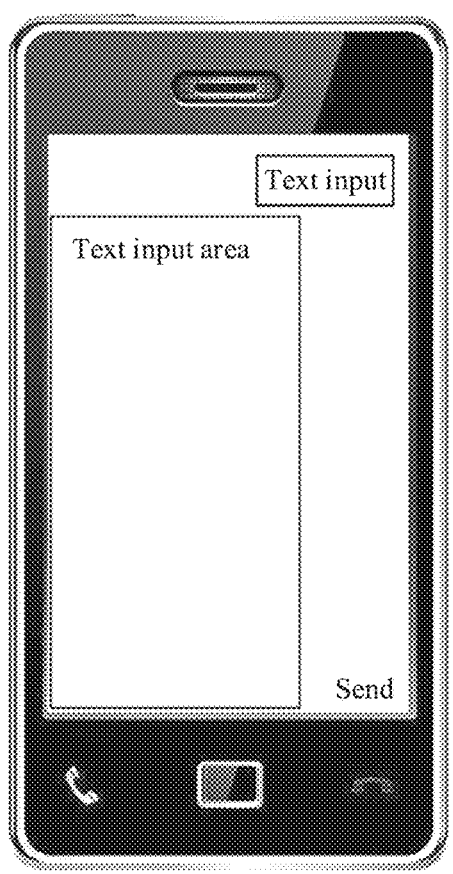
FIG. 3A is a schematic diagram of a text information input screen according to an embodiment of this application.
Figure 3B:
FIG. 3B is a schematic diagram of a screen of a virtual keyboard in a 26-key layout according to an embodiment of this application.

Specifically, the first terminal may establish a communications connection with a second terminal by logging in to a preset application. The preset application may store a menu of the second terminal, for example, a character input manner of the second terminal or a key required for moving a cursor from a position to another position in the second terminal. The preset application may be an application, such as WeChat or TV Home, that can be used for remote control. When the user needs to control the second terminal by using the first terminal, the user may input the text information in the preset area of the first terminal, and the first terminal may obtain the text information that is input in the preset area by the user. The text information may include a Chinese character, a digit, a letter, or the like. The preset area may be a part of or all areas on a display screen of the first terminal. A text information input screen shown in FIG. 3A is used as an example. The preset area may be a text input area, and the first terminal may obtain text information that is input in the text input area by the user.

Optionally, before obtaining the text information that is input in the preset area by the user, the first terminal may receive a confirmation instruction that is input by the user for the text information. FIG. 3A is used as an example. After inputting text information in the preset area of the first terminal, the user taps a "send" key. Then, the first terminal may receive a confirmation instruction submitted by the user for the text information, and obtain the text information that is input in the preset area by the user.

Optionally, since the first terminal detects that the user inputs the text information in the preset area, if the first terminal does not detect, after a preset time period, an input operation performed by the user, the first terminal may output prompt information. The prompt information is used to prompt the user whether to send the text information that is input in the preset area. The user may tap a "send" key in response to the prompt information. Then, the first terminal may receive a confirmation instruction submitted by the user for the text information, and obtain the text information that is input in the preset area by the user.

Step S202: The first terminal obtains an operation type of the text information.

The first terminal may obtain the operation type of the text information. For example, the first terminal may determine the operation type of the text information by using the following three methods:

1. The first terminal may receive operation type information that is input by the user, where the operation type information may include the operation type of the text information. For example, when the user needs to control, by using the first terminal, the second terminal to adjust a volume, the user may input text information and operation type information in the preset area of the first terminal. An operation type included in the operation type information may be a volume adjustment type. Then, the first terminal may obtain the text information that is input in the preset area by the user, and use the volume adjustment type as an operation type of the text information. For another example, when the user needs to control, by using the first terminal, the second terminal to adjust a volume, the user may input text information in the preset area of the first terminal, and tap a "volume adjustment type" option in an operation type menu displayed on the first terminal. Then, the first terminal may obtain the text information that is input in the preset area by the user, and use the volume adjustment type as an operation type of the text information. The operation type menu may include at least one operation type.

2. After obtaining the text information that is input in the preset area by the user, the first terminal may send an operation type obtaining request to the second terminal. The second terminal may send operation type information to the first terminal in response to the operation type obtaining request, and the first terminal may use an operation type included in the operation type information as the operation type of the text information. For example, when playing a movie, the second terminal receives an operation type obtaining request sent by the first terminal. Then, the second terminal may determine that an operation type is a volume adjustment type or a playback progress adjustment type, and send operation type information including the volume adjustment type and the playback progress adjustment type to the first terminal. The first terminal may output prompt information, to prompt the user to select an operation type. If the user selects the volume adjustment type, the first terminal may determine that an adjustment type of text information is the volume adjustment type. For another example, when displaying an account login screen, the second terminal receives an operation type obtaining request sent by the first terminal. Then, the second terminal may determine that an operation type is a text input type, and send operation type information including the text input type to the first terminal. The first terminal may determine that an adjustment type of text information is the text input type.

3. After obtaining the text information that is input in the preset area by the user, the first terminal may compare a character included in the text information with a keyword in a preset database. When at least one character included in the text information matches a target keyword, the first terminal may use an operation type corresponding to the target keyword as the operation type of the text information. The preset database may include at least one keyword, and one keyword corresponds to one operation type. For example, operation types corresponding to digits 0 to 9 each are a channel switching type; operation types corresponding to characters "fast-forward", "fast-backward", "slow-forward" or "slow-backward" each are a playback progress adjustment type; when the keyword is a channel name, the operation type corresponding to the keyword is the channel switching type; when the keyword is a program name, an actor/actress name, or a singer name, the operation type corresponding to the keyword is a text input type. Optionally, a correspondence between the keyword and the operation type may be: A plurality of keywords correspond to one operation type. For example, operation types corresponding to characters "volume" and one or a combination of digits 0 to 9 each are a volume adjustment type; operation types corresponding to characters "user name" and one or a combination of English letters and/or one or a combination of digits 0 to 9 each are the text input type. For example, if the text information that is input in the preset area by the user is "Fast-forward 5 min", the first terminal may determine that the operation type of the text information is the playback progress adjustment type; if the text information that is input in the preset area by the user is "Hunan Satellite Television", the first terminal may determine that the operation type of the text information is the channel switching type.

Step S203: The first terminal recognizes the text information based on the operation type, to obtain at least one key matching the text information.

After determining the operation type of the text information, the first terminal may perform semantic recognition on the text information based on the operation type, to obtain text information after recognition; and obtain, based on a correspondence between a character and a key, the at least one key matching the text information obtained after recognition. For example, if the text information that is input in the preset area by the user is "Play Channel 16", the first terminal determines that the operation type of the text information is the channel switching type. The first terminal may perform semantic recognition on the text information based on the operation type, to obtain the text information after recognition, that is, digits "16". The first terminal may obtain keys matching the text information, that is, a key "1" and a key "6".

Specifically, if virtual keys of the second terminal are in a 26-key layout, keys that the first terminal may obtain and that match the text information are a digit input key "123", the key "1", and the key "6". If virtual keys of the second terminal are in a T9 layout, keys that the first terminal may obtain and that match the text information are the key "1" and the key "6". For example, if the text information that is input in the preset area by the user is "zaijian", the first terminal determines that the operation type of the text information is the text input type. The first terminal may determine that the text information includes characters "zaijian", and obtain keys matching the text information, that is, a key "z", a key "a", a key "i", a key "j", the key "i", the key "a", and a key "n". For another example, if the text information that is input in the preset area by the user is "DARLING", the first terminal determines that the operation type of the text information is the text input type. The first terminal may determine that the text information includes characters "DARLING", and obtain keys matching the text information, that is, a key "D", a key "A", a key "R", a key "L", a key "I", a key "N", and a key "G".

Step S204: The first terminal generates a key value of each key.

After obtaining the key matching the text information, the first terminal may generate the key value of each key based on a correspondence between a key and a key value. For example, the first terminal may obtain a table of the correspondence between the key and the key value, search the table of the correspondence between the key and the key value for the key value corresponding to each key, and generate the key value of the key. For example, in the table of the correspondence between the key and the key value, a key value corresponding to the key "1" is 97, and a key value corresponding to the key "6" is 102. The first terminal may generate a key value of the key "1" and a key value of the key "6", that is, 97 and 102.

Step S205: The first terminal sends the generated key value to the second terminal.

After generating the key value of each key, the first terminal may send the generated key value to the second terminal. For example, the first terminal may send the key values 97 and 102 to the second terminal.

The first terminal may send the key value to the second terminal by using the following two methods:

1. The first terminal sends the key value to the second terminal by using a wireless connection between the first terminal and the second terminal. The wireless connection may include an infrared connection, an ultrasonic wave connection, a Bluetooth connection, a near field communication (NearField Communication, NFC) connection, Wi-Fi, or the like.

2. The first terminal sends the key value to the second terminal through an application interface of a preset application.

Step S206: The second terminal implements a corresponding function in response to the key value.

After receiving the key value, the second terminal may implement the corresponding function in response to the key value. For example, if the key values received by the second terminal are 97 and 102, the second terminal may switch to a channel 16 to play a program.

In the method described in FIG. 2, the first terminal recognizes the text information based on the operation type of the text information that is input by the user, to obtain the at least one key matching the text information; and sends the key value of each key to the second terminal, so that the second terminal implements the corresponding function in response to the key value. This can improve processing efficiency and convenience of operation.

The following describes a terminal control method, implemented when an operation type is a text input type, in this embodiment of this application. A first terminal may obtain text information that is input in a preset area by a user, and determine that an operation type of the text information is the text input type; perform parsing processing on the text information, to obtain at least one character constituting the text information, where the character includes a letter or a digit; determine a position of a cursor on a display screen of a second terminal; determine a key required for moving the cursor from the position to a search area; determine a key required for moving the cursor from the search area to the first character constituting the text information, a key required for moving the cursor from the first character to the second character constituting the text information, and a key required for moving the cursor to a next character in sequence, until a key required for moving the cursor from the penultimate character constituting the text information to the last character constituting the text information; and generate a key value of each key, and send the generated key value to the second terminal.

For example, if text information that is input in the preset area by the user is "zaijian", the first terminal may determine that an operation type of the text information is the text input type, and obtain at least one character, that is, "zaijian", constituting the text information. Then, the first terminal may send a position obtaining request to the second terminal, and the second terminal sends position information of the cursor to the first terminal in response to the position obtaining request. The first terminal may determine the position of the cursor on the display screen of the second terminal based on the position information. The first terminal may prestore a menu of the second terminal, for example, a key required for moving the cursor from a position to another position in the second terminal. The first terminal may determine an arrow key (for example, a left arrow key, a right arrow key, an up arrow key, or a down arrow key) required for moving the cursor to the search area. For example, when the cursor is right below the search area, and there are three movement units between a position of the cursor and a position of the search area, if the second terminal may move by one movement unit in response to one arrow key, the first terminal may determine that keys required for moving the cursor to the search area are three up arrow keys. When the second terminal responds to an OK key, a virtual keyboard is displayed on the display screen of the second terminal, and the first terminal may determine that a key after the three up arrow keys is the OK key. If the virtual keyboard is in the 26-key layout shown in FIG. 3B, the first terminal may determine a key required for moving the cursor from the position of the search area to a position of a character "z". For example, when the character "z" is located right below the search area, and there are four movement units between the position of the character "z" and the position of the search area, the first terminal may determine that keys required for moving the cursor from the position of the search area to the position of the character "z" are four down arrow keys. The first terminal may determine that, keys required for moving the cursor from the character "z" to a character "a" are one up arrow key and one left arrow key; keys required for moving the cursor from the character "a" to a character "i" are six right arrow keys, one up arrow key, and one right arrow key; keys required for moving the cursor from the character "i" to a character "j" are one down arrow key and one left arrow key; keys required for moving the cursor from the character "j" to the character "i" are one up arrow key and one right arrow key; keys required for moving the cursor from the character "i" to the character "a" are one down arrow key and seven left arrow keys; and keys required for moving the cursor from the character "a" to a character "n" are one down arrow key and six right arrow keys.

Optionally, before recognizing the text information based on the operation type to obtain at least one key matching the text information, the first terminal may obtain a character input manner of the second terminal. Then, the first terminal may recognize the text information based on the operation type and the character input manner, to obtain the at least one key matching the text information.

Figure 3E:
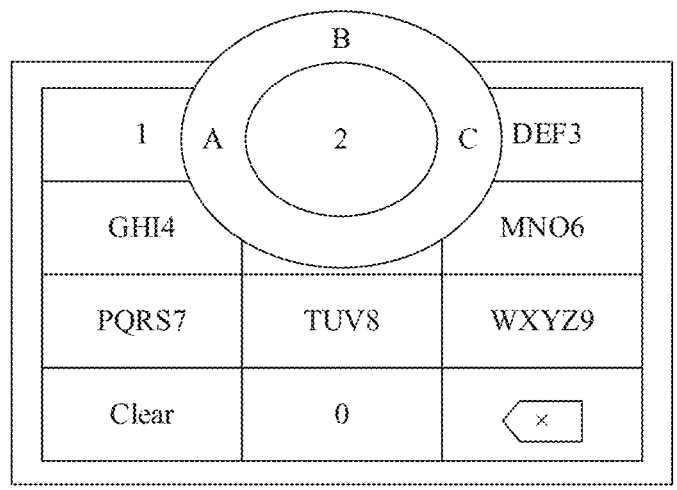
FIG. 3E is a schematic diagram of another screen on which characters are displayed above a virtual keyboard in a suspended manner according to an embodiment of this application.

Specifically, to control the second terminal to implement a same function, different layouts of the virtual keyboard lead to different positions to which the cursor is moved. If the virtual keyboard is in the T9 layout shown in FIG. 3C, the first terminal may determine a key required for moving the cursor from a position of the search area to a position of characters "WXYZ9". For example, when the characters "WXYZ9" are located right below the search area, and there are three movement units between the position of the characters "WXYZ9" and the position of the search area, the first terminal may determine that keys required for moving the cursor from the position of the search area to the position of the characters "WXYZ9" are three down arrow keys. FIG. 3D is used as an example. When the cursor is on a key "WXYZ9", the second terminal may respond to the OK key, and five characters "W", "X", "Y", "Z", and "9" may be displayed above the virtual keyboard in a suspended manner. The cursor is located at a position of the character "9". The second terminal may be controlled, by using the down arrow key, to move the cursor from the position of the character "9" to a position of the character "Z". Then, the second terminal determines that one OK key and one down arrow key are further included after the three down arrow keys. The first terminal may determine that keys required for moving the cursor from characters "WXYZ9" to characters "ABC2" are one left arrow key and two up arrow keys. FIG. 3E is used as an example. When the cursor is on a key "ABC2", the second terminal may respond to the OK key, and four characters "A", "B", "C", and "2" may be displayed above the virtual keyboard in a suspended manner. The cursor is located at a position of the character "2". The second terminal may be controlled, by using the left arrow key, to move the cursor from the position of the character "2" to a position of the character "A". Then, the second terminal determines that one OK key and one left arrow key may further be included after the left arrow key and two up arrow keys. Likewise, the first terminal may obtain, in the foregoing manner, a key required for moving the cursor from the second character to the third character constituting the text information, and a key required for moving the cursor from the third character to a next character in sequence, until a key required for moving the cursor from the penultimate character constituting the text information to the last character constituting the text information.

It should be noted that, the foregoing description is merely an example, and does not constitute a limitation on this embodiment of this application. A layout of the virtual keyboard in this embodiment of this application includes but is not limited to the 26-key layout and the T9 layout such as a fan-shaped layout or a strip layout. A display manner of characters corresponding to a same key includes but is not limited to a ring shape shown in FIG. 3D or FIG. 3E. For example, the characters may be displayed in a fan shape or in one row.

The following describes a terminal control method, implemented when an operation type is the channel switching type, in this embodiment of this application. A first terminal may obtain text information that is input in a preset area by a user, and determine that an operation type of the text information is a channel switching type. When the text information includes a digit, the first terminal may determine a key of each digit; generate a key value of each determined key, where a time interval between generation times of every two adjacent key values is less than a preset time threshold; and send the generated key value to a second terminal. The preset time threshold may be set on the second terminal at delivery. When the time interval between the generation times of every two adjacent key values is less than the preset time threshold, the second terminal may implement one function in response to each key value; when the time interval between the generation times of every two adjacent key values is greater than or equal to the preset time threshold, the second terminal may implement at least two functions in response to each key value. For example, when a time interval between a generation time of a key value of a key "3" and a generation time of a key value of a key "2" is less than the preset time threshold, the second terminal may switch, in response to the key values, to a channel 32 to play a program; when a time interval between a generation time of the key value of the key "3" and a generation time of the key value of the key "2" is greater than or equal to the preset time threshold, the second terminal may switch, in response to the key value of the key "3", to a channel 3 to play a program, and then switch, in response to the key value of the key "2", to a channel 2 to play a program.

For example, if text information that is input in the preset area by the user is "32", the first terminal may determine that an operation type of the text information is the channel switching type; determine keys of digits, that is, a key "3" and a key "2"; and generate a key value of the key "3" and a key value of the key "2", where a time interval between a generation time of the key value of the key "3" and a generation time of the key value of the key "2" is less than the preset time threshold, and send the generated key values to the second terminal.

Optionally, before recognizing the text information based on the operation type to obtain at least one key matching the text information, the first terminal may obtain a character input manner of the second terminal. Then, the first terminal may recognize the text information based on the operation type and the character input manner, to obtain the at least one key matching the text information.

Figure 3F:
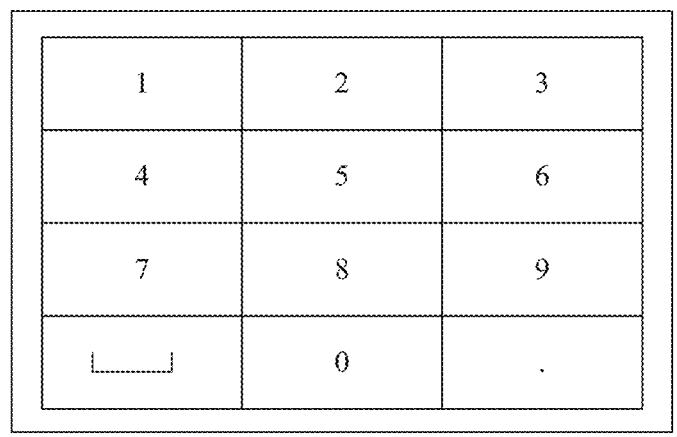
FIG. 3F is a schematic diagram of a screen of a numeric keyboard according to an embodiment of this application.

Specifically, to control the second terminal to implement a same function, different layouts of a virtual keyboard lead to different positions to which a cursor is moved. For example, if the virtual keyboard is in the 26-key layout shown in FIG. 3B, the second terminal may respond to a key "123", and a numeric keyboard may be displayed on a display screen of the second terminal. Then, the first terminal may determine a position of the cursor on the display screen of the second terminal, and determine a key required for moving the cursor from the position to characters "123". If a screen of the numeric keyboard is shown in FIG. 3F, the second terminal may obtain a position of the cursor on the display screen of the second terminal, determine a key required for moving the cursor from the position to a character "3" and a key required for moving the cursor from a position of the character "3" to a position of a character "2", and uses the keys as keys matching the text information. For another example, if the virtual keyboard is in the T9 layout shown in FIG. 3C, the first terminal may determine a position of the cursor on the display screen of the second terminal, and determine a key required for moving the cursor from the position to characters "DEF3". The second terminal may respond to an OK key, and four characters "D", "E", "F", and "3" may be displayed above the virtual keyboard in a suspended manner. The cursor is located at a position of the character "3". The second terminal may obtain the character "3" in response to the OK key. Then, the first terminal may further determine two OK keys after determining the key required for moving the cursor from the position to the characters "DEF3". The first terminal may further obtain a key required for moving the cursor from a position of the characters "DEF3" to a position of characters "ABC2". The second terminal may respond to the OK key, and four characters "A", "B", "C", and "2" may be displayed above the virtual keyboard in a suspended manner. The cursor is located at a position of the character "2". The second terminal may obtain the character "2" in response to the OK key. Then, the first terminal may further determine two OK keys after determining the key required for moving the cursor from the position of the characters "DEF3" to the position of the characters "ABC2".

It should be noted that, the foregoing description is merely an example, and does not constitute a limitation on this embodiment of this application. A layout of the virtual keyboard in this embodiment of this application includes but is not limited to the 26-key layout and the T9 layout such as a fan-shaped layout or a strip layout. A display manner of characters corresponding to a same key includes but is not limited to a ring shape shown in FIG. 3D or FIG. 3E. For example, the characters may be displayed in a fan shape or in one row.

In another implementation, the first terminal may obtain the text information that is input in the preset area by the user, and determine that the operation type of the text information is the channel switching type. When the text information is a Chinese character, the first terminal may obtain a channel identifier of a channel indicated by the text information, and determine a key of a digit corresponding to the channel identifier; generate a key value of each determined key, where a time interval between generation times of every two adjacent key values is less than a preset time threshold; and send the generated key value to the second terminal.

For example, if text information that is input in the preset area by the user is "Play Hunan Satellite Television", the first terminal may obtain a channel identifier of the Hunan Satellite Television. Different channels are identified by using different digits. For example, the China Central Television is identified by using "1", and the Hunan Satellite Television is identified by using "32". The first terminal may determine, based on a correspondence between a channel identifier and digits, that digits corresponding to the channel identifier of the Hunan Satellite Television is "32". Then, in the foregoing manner, the first terminal may determine keys of the digits; generate key values of the determined keys, where a time interval between generation times of every two adjacent key values is less than the preset time threshold; and send the generated key values to the second terminal.

The following describes a terminal control method, implemented when an operation type is a volume adjustment type, in this embodiment of this application. A first terminal may obtain text information that is input in a preset area by a user, and determine that an operation type of the text information is the volume adjustment type. When a playing volume of the second terminal is greater than a playing volume indicated by the text information, the first terminal may determine that a key matching the text information is a volume down key; obtain a difference between the playing volume of the second terminal and the playing volume indicated by the text information; divide the difference by a decrease variation corresponding to the volume down key, to obtain a quotient; and use the quotient as a quantity of volume down keys matching the text information. The first terminal may further generate key values of the quantity of volume down keys, and send the generated key values to the second terminal.

For example, if text information that is input in the preset area by the user is "Adjust volume to 6", the first terminal may determine that an operation type of the text information is the volume adjustment type. Then, the first terminal may send a volume obtaining request to the second terminal, and the second terminal may obtain a current playing volume of the second terminal in response to the volume obtaining request. For example, the current playing volume of the second terminal may be 12, and the second terminal sends the playing volume to the first terminal. The first terminal may compare the playing volume of the second terminal with a playing volume indicated by the text information. If it is determined that the playing volume of the second terminal is greater than the playing volume indicated by the text information, the first terminal may determine that a key matching the text information is the volume down key. Then, the first terminal may obtain a difference, that is, 6, between the playing volume of the second terminal and the playing volume indicated by the text information. For example, each time the second terminal responds to a key value of the volume down key, the second terminal subtracts 1 from the current playing volume of the second terminal. Then, the first terminal may determine that a decrease variation corresponding to the volume down key is 1, and divide the difference by the decrease variation corresponding to the volume down key, to obtain a quotient, that is, 6. The first terminal uses the quotient as a quantity of volume down keys matching the text information. The first terminal may further generate key values of six volume down keys, and send the generated key values to the second terminal.

In another implementation, the first terminal may obtain text information that is input in the preset area by the user, and determine that an operation type of the text information is the volume adjustment type. When a playing volume of the second terminal is less than a playing volume indicated by the text information, the first terminal may determine that a key matching the text information is a volume up key; obtain a difference between the playing volume indicated by the text information and the playing volume of the second terminal; divide the difference by an increase variation corresponding to the volume up key, to obtain a quotient; and use the quotient as a quantity of volume up keys matching the text information. The first terminal may further generate key values of the quantity of volume up keys, and send the generated key values to the second terminal.

It should be noted that, a method in which the first terminal processes text information when an operation type of the text information is a playback progress adjustment type or an episode adjustment type is similar to a method in which the first terminal processes text information when an operation type of the text information is the volume adjustment type. For example, the first terminal may obtain text information that is input in the preset area by the user, and determine that an operation type of the text information is the playback progress adjustment type. When a playback progress of the second terminal exceeds a playback progress indicated by the text information, the first terminal may determine that a key matching the text information is a progress backward key; obtain a difference between the playback progress of the second terminal and the playback progress indicated by the text information; divide the difference by a decrease variation corresponding to the progress backward key, to obtain a quotient; and use the quotient as a quantity of progress backward keys matching the text information. The first terminal may further generate key values of the quantity of progress backward keys, and send the generated key values to the second terminal. For another example, the first terminal may obtain the text information that is input in the preset area by the user, and determine that the operation type of the text information is the playback progress adjustment type. When a playback progress indicated by the text information exceeds a playback progress of the second terminal, the first terminal may determine that a key matching the text information is a progress forward key; obtain a difference between the playback progress indicated by the text information and the playback progress of the second terminal; divide the difference by an increase variation corresponding to the progress forward key, to obtain a quotient; and use the quotient as a quantity of progress forward keys matching the text information. The first terminal may further generate key values of the quantity of progress forward keys, and send the generated key values to the second terminal. For another example, the first terminal may obtain text information that is input in the preset area by the user, and determine that an operation type of the text information is the episode adjustment type. When an identifier of an episode currently played by the second terminal is greater than an identifier that is of an episode and that is indicated by the text information, the first terminal may determine that a key matching the text information is a previous-episode key; obtain a difference between the identifier of the episode currently played by the second terminal and the identifier that is of the episode and that is indicated by the text information; divide the difference by a decrease variation corresponding to the previous-episode key, to obtain a quotient; and use the quotient as a quantity of previous-episode keys matching the text information. The first terminal may further generate key values of the quantity of previous-episode keys, and send the generated key values to the second terminal. For another example, the first terminal may obtain the text information that is input in the preset area by the user, and determine that the operation type of the text information is the episode adjustment type. When an identifier of an episode currently played by the second terminal is less than an identifier that is of an episode and that is indicated by the text information, the first terminal may determine that a key matching the text information is a next-episode key; obtain a difference between the identifier of the episode currently played by the second terminal and the identifier that is of the episode and that is indicated by the text information; divide the difference by an increase variation corresponding to the next-episode key, to obtain a quotient; and use the quotient as a quantity of next-episode keys matching the text information. The first terminal may further generate key values of the quantity of next-episode keys, and send the generated key values to the second terminal.

The following describes a terminal control method, implemented when an operation type is a program playback type, in this embodiment of this application. The first terminal may obtain text information that is input in a preset area by a user, and determine that an operation type of the text information is the program playback type. The first terminal may determine a channel identifier corresponding to a last playback. When the channel identifier corresponding to the last playback is less than a channel identifier indicated by the text information, the first terminal may obtain a quantity of channel identifiers between the channel identifier corresponding to the last playback and the channel identifier indicated by the text information; and determine that a key matching the text information is at least one playback function key, where a quantity of the at least one playback function key is obtained based on the quantity of channel identifiers between the channel identifier corresponding to the last playback and the channel identifier indicated by the text information.

Figure 3G:
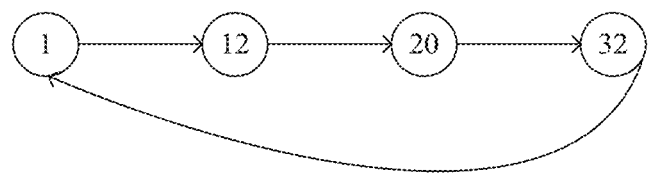
FIG. 3G is a schematic diagram of a screen of a playback list according to an embodiment of this application.

Specifically, the second terminal may implement a playback function in response to the playback function key. For example, the user may control, by using the first terminal, the second terminal to generate a playback list, where the playback list may include at least two channel identifiers. The user may send a key value of the playback function key to the second terminal by using the first terminal, and the second terminal may play back, in response to the key value of the playback function key, a program on a channel corresponding to the specified channel identifier. The screen shown in FIG. 3G is used as an example. Channel identifiers included in the playback list are 1, 12, 20, and 32. If text information that is input in the preset area by the user is "Play back Channel 32", the first terminal may determine that an operation type of the text information is the program playback type. The first terminal may further send a playback information obtaining request to the second terminal, and the second terminal may send, in response to the playback information obtaining request, a channel identifier corresponding to a last playback to the first terminal. If the channel identifier corresponding to the last playback is 1, the first terminal may determine that the channel identifier corresponding to the last playback is less than a channel identifier indicated by the text information. The first terminal obtains a quantity, that is, 2, of channel identifiers between the channel identifier corresponding to the last playback and the channel identifier indicated by the text information. Then, the first terminal may add 1 and the quantity of channel identifiers between the channel identifier corresponding to the last playback and the channel identifier indicated by the text information, to obtain a quantity of playback function keys matching the text information. To be specific, the first terminal may determine that the quantity of playback function keys matching the text information is 3, generate key values of the three playback function keys, and send the generated key values to the second terminal.

In another possible implementation, the first terminal may obtain text information that is input in the preset area by the user, and determine that an operation type of the text information is the program playback type. The first terminal may determine a channel identifier corresponding to a last playback. When the channel identifier corresponding to the last playback is greater than a channel identifier indicated by the text information, the first terminal may obtain a first quantity of channel identifiers between the first channel identifier and the last channel identifier that are in a playback list; obtain a second quantity of channel identifiers between the channel identifier corresponding to the last playback and the channel identifier indicated by the text information; and determine that a key matching the text information is at least one playback function key, where a quantity of the at least one playback function key is obtained based on the first quantity and the second quantity. For example, the quantity of the at least one playback function key is obtained by adding 1 and a difference that is obtained by subtracting the second quantity from the first quantity. The screen shown in FIG. 3G is used as an example. Channel identifiers included in the playback list are 1, 12, 20, and 32. If text information that is input in the preset area by the user is "Play back Channel 12", the first terminal may determine that an operation type of the text information is the program playback type. The first terminal may further send a playback information obtaining request to the second terminal, and the second terminal may send, in response to the playback information obtaining request, a channel identifier corresponding to a last playback to the first terminal. If the channel identifier corresponding to the last playback is 32, the first terminal may determine that the channel identifier corresponding to the last playback is greater than a channel identifier indicated by the text information. The first terminal obtains a first quantity, that is, 2, of channel identifiers between the first channel identifier and the last channel identifier in the playback list, and obtains a second quantity, that is, 1, of channel identifiers between the channel identifier corresponding to the last playback and the channel identifier indicated by the text information. Then, the first terminal may add 1 and a difference that is obtained by subtracting the second quantity from the first quantity, to obtain a quantity of playback function keys matching the text information. To be specific, the first terminal may determine that the quantity of playback function keys matching the text information is 2, generate key values of the two playback function keys, and send the generated key values to the second terminal.

The methods in the embodiments of this application are described above in detail, and the following describes terminals in the embodiments of this application.

Figure 4:
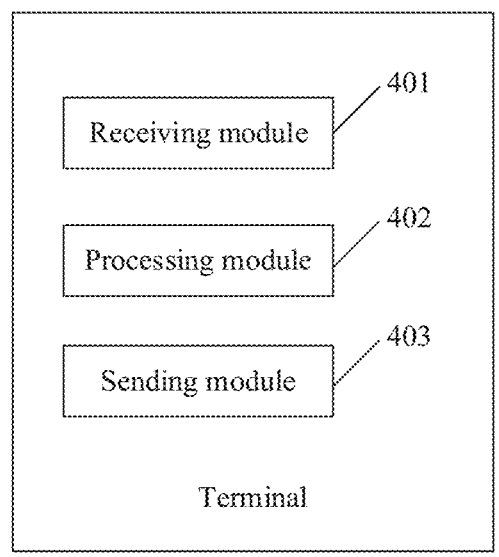
FIG. 4 is a schematic structural diagram of a terminal according to an embodiment of this application.

FIG. 4 is a schematic structural diagram of a terminal according to an embodiment of this application. The terminal is configured to implement a function of the first terminal in the embodiment shown in FIG. 2. Functional blocks of the terminal may be implemented by using hardware, software, or a combination of hardware and software, to implement the solutions of this application. Persons skilled in the art should understand that the functional blocks described in FIG. 4 may be combined or separated into sub-blocks, to implement the solutions of this application. Therefore, the content described above in this application may support any possible combination, separation, or further definition of the following functional modules.

As shown in FIG. 4, the terminal may include a receiving module 401, a processing module 402, and a sending module 403. Detailed descriptions of the modules are as follows:

The receiving module 401 is configured to obtain text information that is input in a preset area of the terminal by a user.

The processing module 402 is configured to determine an operation type of the text information.

The processing module 402 is further configured to recognize the text information based on the operation type, to obtain at least one key matching the text information.

The processing module 402 is further configured to generate a key value of each key.

The sending module 403 is configured to send the generated key value to a second terminal, to control the second terminal by using the key value.

Optionally, when the operation type is a text input type, the processing module 402 recognizes the text information based on the operation type, to obtain the at least one key matching the text information, and the processing module 402 is specifically configured to:

perform parsing processing on the text information, to obtain at least one character constituting the text information, where the character includes a letter or a digit:

determine a position of a cursor on a display screen of the second terminal;

determine a key required for moving the cursor from the position to a search area; and determine a key required for moving the cursor from the search area to the first character constituting the text information, a key required for moving the cursor from the first character to the second character constituting the text information, and a key required for moving the cursor to a next character in sequence, until a key required for moving the cursor from the penultimate character constituting the text information to the last character constituting the text information.

Optionally, when the optional alternative is a channel switching type, the processing module 402 recognizes the text information based on the operation type, to obtain at least one key matching the text information. The processing module 402 is specifically configured to:

when the text information includes a digit, determine a key of each digit; or when the text information is a Chinese character, obtain a channel identifier of a channel indicated by the text information, and determine a key of a digit corresponding to the channel identifier.

The processing module 402 generates the key value of each key, and the processing module 402 is specifically configured to:

generate a key value of each determined key, where a time interval between generation times of every two adjacent key values is less than a preset time threshold.

Optionally, when the operation type is a volume adjustment type, the processing module 402 recognizes the text information based on the operation type, to obtain the at least one key matching the text information, and the processing module 402 is specifically configured to:

when a playing volume of the second terminal is greater than a playing volume indicated by the text information, determine that the key matching the text information is a volume down key;

obtain a first difference between the playing volume of the second terminal and the playing volume indicated by the text information;

divide the first difference by a decrease variation corresponding to the volume down key, to obtain a first quotient; and use the first quotient as a quantity of volume down keys matching the text information; or when a playing volume of the second terminal is less than a playing volume indicated by the text information, determine that the key matching the text information is a volume up key;

obtain a second difference between the playing volume indicated by the text information and the playing volume of the second terminal;

divide the second difference by an increase variation corresponding to the volume up key, to obtain a second quotient; and use the second quotient as a quantity of volume up keys matching the text information.

Optionally, when the operation type is a program playback type, the processing module 402 recognizes the text information based on the operation type, to obtain the at least one key matching the text information, and the processing module 402 is specifically configured to:

determine a channel identifier corresponding to a last playback; and when the channel identifier corresponding to the last playback is less than a channel identifier indicated by the text information, obtain a quantity of channel identifiers between the channel identifier corresponding to the last playback and the channel identifier indicated by the text information; and determine that the key matching the text information is at least one playback function key, where a quantity of the at least one playback function key is obtained based on the quantity of channel identifiers between the channel identifier corresponding to the last playback and the channel identifier indicated by the text information; or when the channel identifier corresponding to the last playback is greater than a channel identifier indicated by the text information, obtain a difference by subtracting a quantity of channel identifiers between the channel identifier corresponding to the last playback and the channel identifier indicated by the text information from a total quantity of channel identifiers that can be played back; and determine that the key matching the text information is at least one playback function key, where a quantity of the at least one playback function key is obtained based on the difference.

Optionally, the receiving module 401 is further configured to: before the processing module 402 recognizes the text information based on the operation type to obtain the at least one key matching the text information, obtain a character input manner of the second terminal.

The processing module 402 recognizes the text information based on the operation type, to obtain the at least one key matching the text information, and the processing module 402 is specifically configured to:

recognize the text information based on the operation type and the character input manner, to obtain the at least one key matching the text information.

Optionally, the processing module 402 recognizes the text information based on the operation type, to obtain the at least one key matching the text information, and the processing module 402 is specifically configured to:

recognize the text information based on the operation type, to obtain text information after recognition; and obtain at least one key matching the text information obtained after recognition.

It should be noted that, for implementation of each module, reference may be correspondingly made to corresponding descriptions in the embodiment shown in FIG. 2.

It should be noted that, in this embodiment of this application, division into the modules is an example, is merely logical function division, and may be other division in an actual implementation. The functional modules in this embodiment of this application may be integrated into one processing module, or each of the modules may exist alone physically, or two or more modules are integrated into one module. The integrated module may be implemented in a form of hardware, or may be implemented in a form of a software functional module.

Figure 5A:
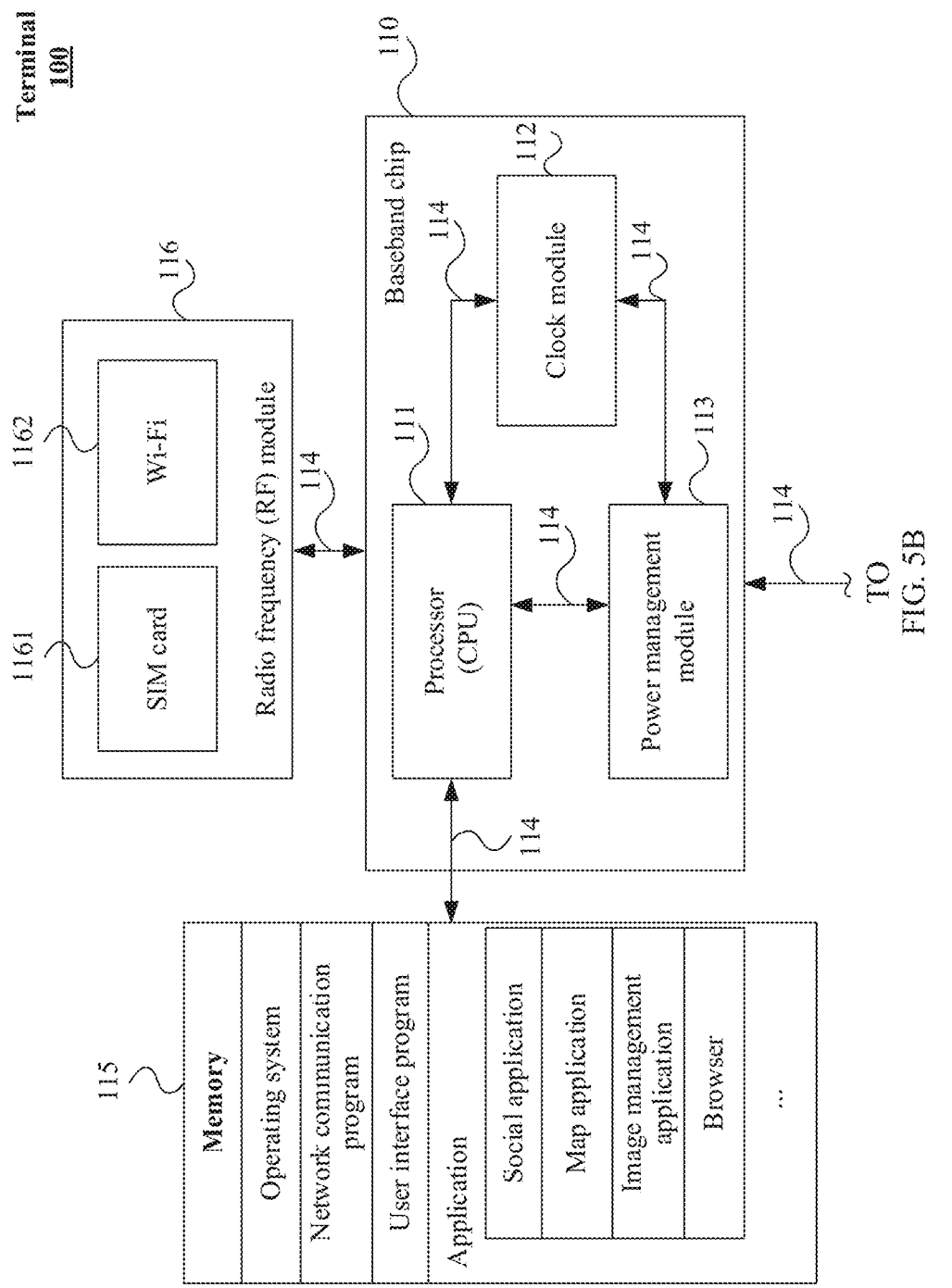
FIG. 5A and FIG. 5B are a schematic structural diagram of a terminal according to an embodiment of this application.
Figure 5B:
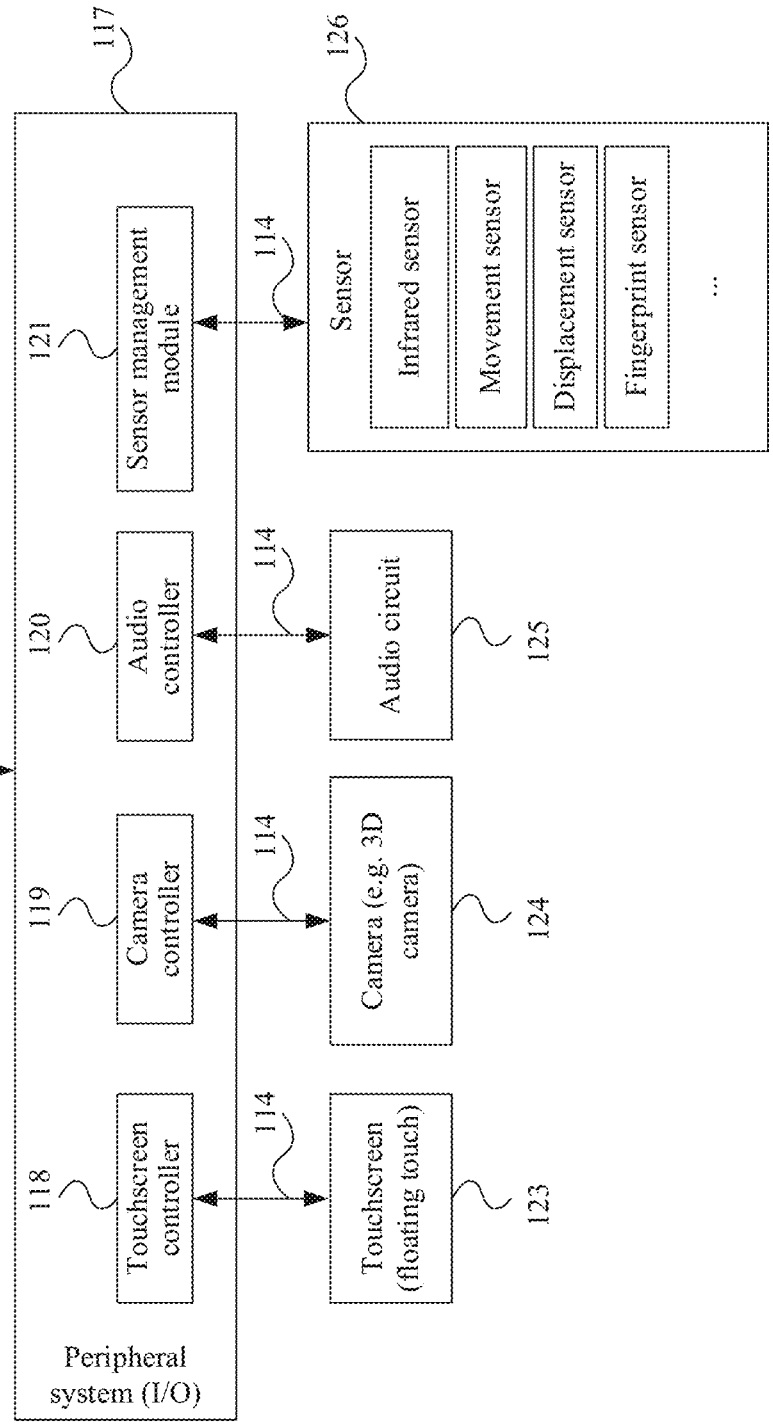

FIG. 5A and FIG. 5B are a schematic structural diagram of a terminal according to an embodiment of this application. As shown in FIG. 5A and FIG. 5B, the terminal 100 may include a baseband chip 110, a memory 115 (one or more computer readable storage mediums), a radio frequency (Radio Frequency. RF) module 116, and a peripheral system 117. These components may perform communication by using one or more communications buses 114.

The peripheral system 117 is mainly configured to implement a function of interaction between the terminal 110 and a user/an external environment, and mainly includes an input/output apparatus of the terminal 100. In specific implementation, the peripheral system 117 may include at least one of a touchscreen controller 118, a camera controller 119, an audio controller 120, and a sensor management module 121. Each controller may be coupled to a respective peripheral device (such as a touchscreen 123, a camera 124, an audio circuit 125, and a sensor 126). In some embodiments, the touchscreen 123 may be a touchscreen provided with a self-capacitance floating touch panel, or a touchscreen provided with an infrared floating touch panel. In some embodiments, the camera 124 may be a 3D camera. It should be noted that, the peripheral system 117 may further include another I/O peripheral.

The baseband chip 110 may integrate and include one or more processors 111, a clock module 112, and a power management module 113. The clock module 112 integrated into the baseband chip 110 is mainly configured to generate, for the processor 111, a clock required for data transmission and timing control. The power management module 113 integrated into the baseband chip 110 is mainly configured to provide a stable and highly precious voltage for the processor 111, the radio frequency module 116, the peripheral system, and the like.

The radio frequency (RF) module 116 is configured to send and receive radio frequency signals, and mainly integrates a receiver and a transmitter that are of the terminal 100. The radio frequency (RF) module 116 communicates with a communications network and another communications device by using the radio frequency signal. In specific implementation, the radio frequency (RF) module 116 may include but is not limited to an antenna system, an RF transceiver, one or more amplifiers, a tuner, one or more oscillators, a digital signal processor, a CODEC chip, a SIM card, a storage medium, and the like. In some embodiments, the radio frequency (RF) module 116 may be implemented on an independent chip.

The memory 115 is coupled to the processor 111, and is configured to store various software programs and/or a plurality of sets of instructions. In specific implementation, the memory 115 may include a high-speed random access memory, and may further include a non-volatile memory, for example, one or more magnetic disk storage devices, a flash memory device, or another non-volatile solid-state storage device. The memory 115 may store an operating system (hereinafter referred to as a system), for example, an embedded operating system such as ANDROID, IOS, WINDOWS, or LINUX. The memory 115 may further store a network communications program. The network communications program may be used for communication with one or more additional devices, terminal devices, and network devices. The memory 115 may further store a user interface program. The user interface program may use a graphical operation interface to visually display content of an application program, and use input controls such as menus, dialog boxes, and keys to receive control operations of the user on the application program.

The memory 115 may further store one or more application programs. As shown in FIG. 5A and FIG. 5B, the applications may include a social application program (such as Facebook), an image management program (such as album), a map application program (such as Google Maps), a browser (such as Safari or Google Chrome), and the like.

It should be understood that, the terminal 100 is merely an example provided in this embodiment of this application. Moreover, the terminal 100 may have more or fewer components than the shown components, or a combination of two or more components, or components arranged in a different manner.

Specifically, the terminal described in this embodiment of this application may be configured to perform some or all procedures in the method embodiments described in this application with reference to FIG. 2.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

What is claimed is:

1. A terminal control method implemented by a first terminal, comprising:
    obtaining text information that is input in a preset area of the first terminal;
    determining an operation type of the text information;
    obtaining a character input manner of a second terminal;
    recognizing the text information based on the operation type and the character input manner to obtain second text information after recognition;
    obtaining a first key matching the second text information;
    generating a first key value of the first key; and
    sending the first key value to the second terminal to control the second terminal using the first key value.

2. The terminal control method of claim 1, wherein the operation type is a text input type, and wherein the terminal control method further comprises:
    performing parsing processing on the text information to obtain a first character associated with the text information, wherein the character comprises a letter or a digit;
    determining a position of a cursor on a display screen of the second terminal;
    determining a second key required for moving the cursor from the position to a search area;
    determining a third key required for moving the cursor from the search area to a second character associated with the text information;
    determining a fourth key required for moving the cursor from the second character to a third character associated with the text information; and
    determining a fifth key required for moving the cursor to a next character in sequence until a sixth key required for moving the cursor from a penultimate character associated with the text information to a last character associated with the text information.

3. The terminal control method of claim 1, wherein the operation type is a channel switching type, and wherein the terminal control method further comprises:
    determining a second key of a first digit when the text information comprises the first digit;
    obtaining a channel identifier of a channel indicated by the text information and determining a third key of a second digit corresponding to the channel identifier when the text information is a Chinese character; and
    generating a second key value of the second key or a third key value of the third key, wherein a time interval between generation times of two adjacent key values is less than a preset time threshold.

4. The terminal control method of claim 1, wherein the operation type is a volume adjustment type, and wherein the terminal control method further comprises:
    identifying that a first playing volume of the second terminal is greater than a second playing volume indicated by the text information;
    determining that the first key is a volume down key;
    obtaining a first difference between the first playing volume and the second playing volume;
    dividing the first difference by a decrease variation corresponding to the volume down key to obtain a first quotient; and
    setting the first quotient as a quantity of volume down keys matching the text information.

5. The terminal control method of claim 1, wherein the operation type is a program playback type, and wherein the terminal control method further comprises:
    determining a first channel identifier corresponding to a last playback;
    identifying that the first channel identifier is less than a second channel identifier indicated by the text information;
    obtaining, in response to the identifying, a quantity of channel identifiers between the first channel identifier and the second channel identifier;
    determining that the first key is a playback function key; and
    obtaining a quantity of playback function keys based on the quantity of channel identifiers.

6. The terminal control method of claim 1, wherein the preset area is a text input area.

7. A terminal, comprising:
    a receiver configured to:
        obtain text information that is input in a preset area of the terminal; and
        obtain a character input manner of a second terminal;
    a processor coupled to the receiver and configured to:
        determine an operation type of the text information;
        recognize the text information based on the operation type and the character input manner to obtain second text information after recognition;
        obtain a first key matching the second text information; and
        generate a first key value of the first key; and
    a transmitter coupled to the processor and configured to send the first key value to the second terminal to control the second terminal using the first key value.

8. The terminal of claim 7, wherein the operation type is a text input type, and wherein the processor is further configured to:
    determine that the operation type is the text input type;
    perform parsing processing on the text information to obtain a first character associated with the text information, wherein the character comprises a letter or a digit;
    determine a position of a cursor on a display screen of the second terminal;
    determine a second key required for moving the cursor from the position to a search area;
    determine a third key required for moving the cursor from the search area to a second character associated with the text information;
    determine a fourth key required for moving the cursor from the second character to a third character associated with the text information;
    determine a fifth key required for moving the cursor to a next character in sequence until a sixth key required for moving the cursor from a penultimate character associated with the text information to a last character associated with the text information; and
    generate a second key value of the third key, a third key value of the fourth key and a fourth key value of the fifth key.

9. The terminal of claim 7, wherein the operation type is a channel switching type, and wherein the processor is further configured to:

determine the operation type is the channel switching type;

determine a second key of a digit when the text information comprises the digit;

obtain a channel identifier of a channel indicated by the text information and determine a third key of a digit corresponding to the channel identifier when the text information is a Chinese character; and generate a second key value of the second key or a third key value of the third key, wherein a time interval between generation times of two adjacent key values is less than a preset time threshold.

10. The terminal of claim 7, wherein the operation type is a volume adjustment type, and wherein the processor is further configured to:

determine that the operation type is the volume adjustment type;

identify that a first playing volume of the second terminal is greater than a second playing volume indicated by the text information;

determine that the first key is a volume down key;

obtain a first difference between the first playing volume and the second playing volume;

divide the first difference by a decrease variation corresponding to the volume down key to obtain a first quotient;

set the first quotient as a quantity of volume down keys matching the text information; and generate a second key value of the volume down key, wherein the transmitter is further configured to send the second key value and the quantity of volume down keys to the second terminal to control the second terminal using the second key value and the quantity of volume down keys.

11. The terminal of claim 7, wherein the operation type is a volume adjustment type, and wherein the processor is further configured to:

determine the operation type is the volume adjustment type;

identify that a first playing volume of the second terminal is less than a second playing volume indicated by the text information;

determine that the first key is a volume up key;

obtain a second difference between the first playing volume and the second playing volume;

divide the second difference by an increase variation corresponding to the volume up key to obtain a second quotient;

set the second quotient as a quantity of volume up keys matching the text information; and generate a second key value of the volume up key, wherein the transmitter is further configured to send the second key value and the quantity of volume up keys to the second terminal to control the second terminal using the second key value and the quantity of volume up keys.

12. The terminal of claim 7, wherein the operation type is a program playback type, and wherein the processor is further configured to:

determine that the operation type is the program playback type;

determine a first channel identifier corresponding to a last playback;

identify that the first channel identifier is less than a second channel identifier indicated by the text information;

obtain a quantity of channel identifiers between the first channel identifier and the second channel identifier;

determine that the first key is a playback function key;

obtain a quantity of playback function keys based on the quantity of channel identifiers; and generate a second key value of the playback function key, wherein the transmitter is further configured to send the second key value and the quantity of the playback function keys to the second terminal to control the second terminal using the second key value and the quantity of the playback function keys.

13. The terminal of claim 7, wherein the operation type is a program playback type, and wherein the processor is further configured to:

determine that the operation type is the program playback type;

determine a first channel identifier corresponding to a last playback;

identify that the first channel identifier is greater than a second channel identifier indicated by the text information;

obtain a difference by subtracting a quantity of channel identifiers between the first channel identifier and the second channel identifier from a total quantity of channel identifiers corresponding to programs capable of play back;

determine that the first key is a playback function key; and obtain a quantity of playback function keys based on the difference, wherein the transmitter is further configured to send the first key value and the quantity of the playback function keys to the second terminal to control the second terminal using the first key value and the quantity of the playback function keys.

14. The terminal of claim 7, wherein the preset area is a text input area.

15. A computer program product comprising computer-executable instructions for storage on a non-transitory computer storage medium that, when executed by a processor, cause a first terminal to:

obtain text information that is input in a preset area of the first terminal;

determine an operation type of the text information;

obtain a character input manner of a second terminal;

recognize the text information based on the operation type and the character input manner to obtain second text information after recognition;

obtain a first key matching the second text information;

generate a first key value of the first key; and send the first key value to the second terminal to control the second terminal using the first key value.

16. The terminal control method of claim 1, wherein the operation type is a program playback type, and wherein the terminal control method further comprises:

determining a first channel identifier corresponding to a last playback;

identifying that the first channel identifier is greater than a second channel identifier indicated by the text information;

obtaining a difference by subtracting a quantity of channel identifiers between the first channel identifier and the second channel identifier from a total quantity of channel identifiers corresponding to programs capable of play back;

determining that the first key is a playback function key; and obtaining a quantity of playback function keys based on the difference.

17. The terminal control method of claim 1, wherein the operation type is a volume adjustment type, and wherein the terminal control method further comprises:
- identifying that a first playing volume of the second terminal is less than a second playing volume indicated by the text information;
- determining that the first key is a volume up key;
- obtaining a second difference between the second playing volume and the first playing volume;
- dividing the second difference by an increase variation corresponding to the volume up key to obtain a second quotient; and
- setting the second quotient as a quantity of volume up keys matching the text information.

18. The computer program product of claim 15, wherein the operation type is a text input type, and wherein the computer-executable instructions further cause the first terminal to:
- perform parsing processing on the text information to obtain a first character associated with the text information, wherein the character comprises a letter or a digit;
- determine a position of a cursor on a display screen of the second terminal;
- determine a second key required for moving the cursor from the position to a search area;
- determine a third key required for moving the cursor from the search area to a second character associated with the text information;
- determine a fourth key required for moving the cursor from the second character to a third character associated with the text information; and
- determine a fifth key required for moving the cursor to a next character in sequence until a sixth key required for moving the cursor from a penultimate character associated with the text information to a last character associated with the text information.

19. The computer program product of claim 15, wherein the operation type is a channel switching type, and wherein the computer-executable instructions further cause the first terminal to:
- determine a second key of a first digit when the text information comprises the first digit;
- obtain a channel identifier of a channel indicated by the text information, and determine a third key of a second digit corresponding to the channel identifier when the text information is a Chinese character; and
- generate a second key value of the second key or a third key value of the third key, wherein a time interval between generation times of two adjacent key values is less than a preset time threshold.

20. The computer program product of claim 15, wherein the preset area is a text input area.

* * * * *